(No Model.)

H. A. TILLETT, T. D. TARPLEY & R. J. MOORE.
COMBINED HOOK AND HAMMER.

No. 542,178. Patented July 2, 1895.

Witnesses

Inventors
Henry A. Tillett,
Thomas D. Tarpley.
Robert J. Moore
By Lucy B. Hills
Attorney

UNITED STATES PATENT OFFICE.

HENRY AUGUSTUS TILLETT, THOMAS DEE TARPLEY, AND ROBERT JONES MOORE, OF ABILENE, TEXAS.

COMBINED HOOK AND HAMMER.

SPECIFICATION forming part of Letters Patent No. 542,178, dated July 2, 1895.

Application filed May 21, 1894. Serial No. 512,024. (No model.)

*To all whom it may concern:*

Be it known that we, HENRY AUGUSTUS TILLETT, THOMAS DEE TARPLEY, and ROBERT JONES MOORE, citizens of the United States, residing at Abilene, in the county of Taylor and State of Texas, have invented a new and useful Combined Hook and Hammer for Handling Cotton-Bales and Similar Articles, of which the following is a specification.

Our invention relates to that class of articles commonly known as grab-hooks, such as are used by draymen and other laborers in handling all kinds of bales, boxes, baggage, barrels, and bundles of every nature and description having any considerable bulk and weight; and it has for its objects, first, to provide a device that will combine in its structure the ordinary hook for engaging with the article to be moved, and a handle adapted, when desired, to be used as a hammer, thus dispensing with the necessity for a separate implement of this character, and, second, to combine with the said hook and handle improved means for preventing the accidental contact of the hand of the operator with the article to be handled. These objects we accomplish in the manner and by the means hereinafter described and claimed, reference being had to the accompanying drawings, in which—

Figure 1:
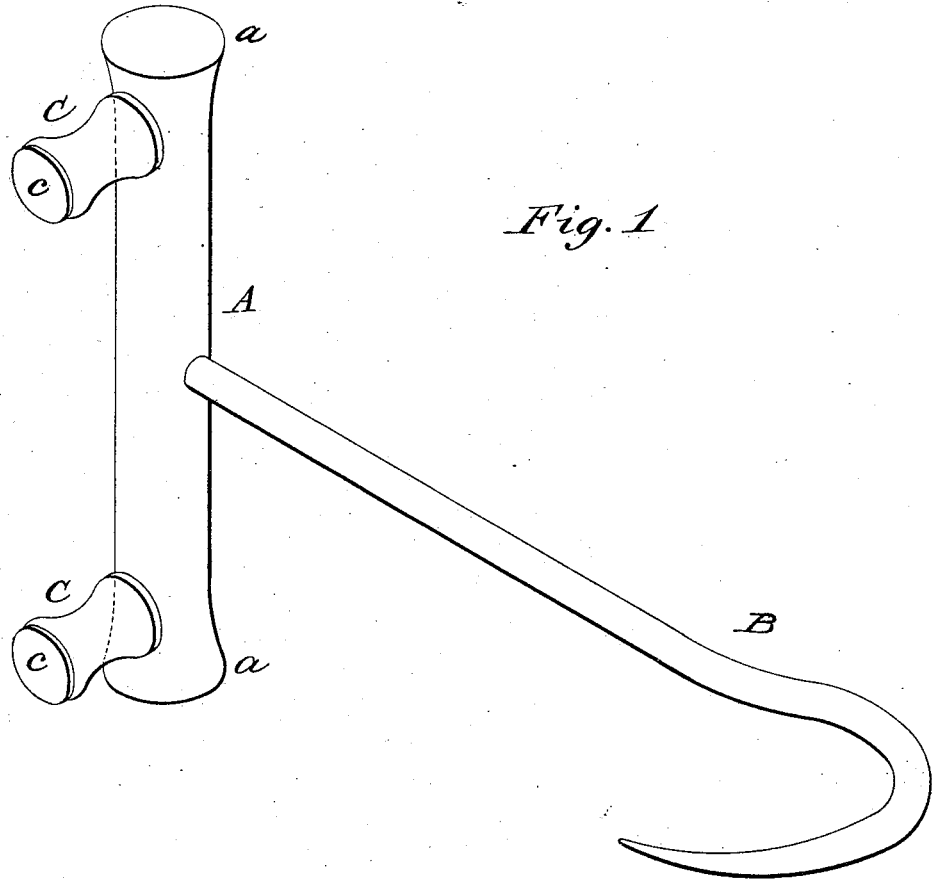
Figure 2:
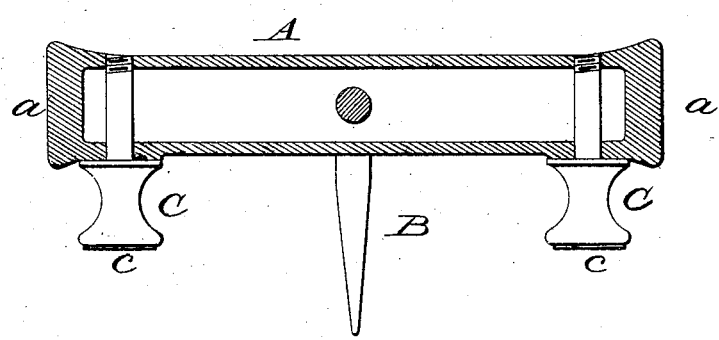

Figure 1 is a perspective view of my improved device. Fig. 2 is a vertical longitudinal section taken through the handle of the same.

In the said drawings, the letter A denotes the handle of the device, and B the hook proper. This handle A is composed preferably of malleable iron or steel and is formed hollow throughout its length, its ends being closed, as shown in Fig. 2. These ends are rounded and may be made slightly enlarged, as at $a$, and are adapted to be used as a hammer by the operator, thus dispensing with the necessity for a separate implement of that character so often required, especially in handling barrels, boxes, and such other articles as are nailed together. The hook B is of the usual construction in implements of this character and is fastened into the handle A in any preferred manner.

Attached to each end of the handle A and projecting from the side thereof are the guards or projections C, having their flattened outer ends covered with pads or protectors $c$, formed of any suitable soft material, such as felt, rubber, or leather, to prevent injury to the article handled where the latter has a smooth or polished surface. These flattened ends also serve to prevent the projections from embedding themselves in the article handled, where it consists of soft material. These guards or projections, when the implement is in use, rest against the bale, barrel, or other article to be handled, and prevent that part of the handle around which the hand of the operator is clasped from coming in contact with the same, thus permitting the free use of the hand without danger of scratching or injuring the same, as frequently occurs in the use of the ordinary hook.

By forming the handle of metal and hollow throughout its length we obtain greater durability and strength and at the same time avoid unneccessary weight.

Having thus described our invention, what we claim as new, and desire to secure by Letters Patent, is—

A hook for handling bales and other articles, consisting of the hollow handle A having its rounded ends $a$ closed and adapted to form hammer heads, the hook proper B attached to said handle, the guards or projections C attached to said handle, and the pads or protectors $c$ on the ends thereof, substantially as set forth.

HENRY AUGUSTUS TILLETT.
THOMAS DEE TARPLEY.
ROBERT JONES MOORE.

Witnesses:
J. E. COCKRELL,
J. W. HALEY.